(12) United States Patent
Joughin

(10) Patent No.: US 10,384,709 B2
(45) Date of Patent: Aug. 20, 2019

(54) ACTUATOR FOR TURNING A STEERING WHEEL IN AUTOMATIC STEERING SYSTEMS

(71) Applicant: AGJUNCTION LLC, Hiawatha, KS (US)

(72) Inventor: Alan Robert Joughin, Union City, CA (US)

(73) Assignee: AGJUNTION LLC, Hiawatha, KS (US)

( * ) Notice: Subject to any disclaimer, the term of this patent is extended or adjusted under 35 U.S.C. 154(b) by 82 days.

(21) Appl. No.: 15/784,804

(22) Filed: Oct. 16, 2017

(65) Prior Publication Data
US 2018/0105200 A1    Apr. 19, 2018

Related U.S. Application Data

(60) Provisional application No. 62/409,210, filed on Oct. 17, 2016.

(51) Int. Cl.
*B62D 5/02* (2006.01)
*B62D 5/04* (2006.01)
(Continued)

(52) U.S. Cl.
CPC .............. *B62D 5/0409* (2013.01); *B62D 1/00* (2013.01); *B62D 5/04* (2013.01); *B62D 5/0403* (2013.01);
(Continued)

(58) Field of Classification Search
CPC .......... B62D 5/04; B62D 5/0409; B62D 1/02; B62D 1/04; B62D 1/10
See application file for complete search history.

(56) References Cited

U.S. PATENT DOCUMENTS 3,003,363 A * 10/1961 De Hart .............. B25B 27/0035
                                                           180/321
5,194,851 A    3/1993 Kraning et al.
(Continued)

FOREIGN PATENT DOCUMENTS

| CN | 203812091 U | 9/2014 |
|----|-------------|--------|
| EP | 1787889 A1 | 5/2007 |
| WO | 1995/015499 A1 | 6/1995 |

OTHER PUBLICATIONS

"The evolution of portable valve actuators", https://www.linkedin.com/pulse/evolution-portable-valve-actuators-tim-hughes, Jul. 5, 2017, pp. 1-5.
(Continued)

*Primary Examiner* — Tony H Winner
(74) *Attorney, Agent, or Firm* — Schwabe Williamson & Wyatt

(57) ABSTRACT

A steering wheel actuator mechanism includes a frame assembly and a rotating assembly. The frame assembly is attached to a steering wheel column and the rotating assembly is attached around the steering wheel column and over the frame assembly. In one example, the frame assembly and the rotating assembly can be located around the steering wheel column without removing the steering wheel. The rotating assembly is inserted down into an opening formed in the frame assembly and rotationally engaged with a motor housed in the frame assembly. Actuators are attached to the rotating assembly and positioned to extend upwards through the steering wheel next to spokes in the steering wheel. The rotating assembly causes the actuators to move the spokes and rotate the steering wheel.

21 Claims, 14 Drawing Sheets

(51) Int. Cl.
    *B62D 15/02*     (2006.01)
    *F16H 1/06*     (2006.01)
    *B62D 1/00*     (2006.01)
    *G05D 1/02*     (2006.01)

(52) U.S. Cl.
    CPC ........... *B62D 5/046* (2013.01); *B62D 15/025* (2013.01); *F16H 1/06* (2013.01); *G05D 1/021* (2013.01)

(56) References Cited

U.S. PATENT DOCUMENTS

| | | | |
|---|---|---|---|
| 5,390,125 A | 2/1995 | Sennott et al. | |
| 5,615,581 A * | 4/1997 | Cordioli | B60S 5/00 33/203 |
| 5,663,879 A | 9/1997 | Trovato | |
| 5,923,270 A | 7/1999 | Sampo | |
| 5,928,309 A | 7/1999 | Korver et al. | |
| 6,052,647 A | 4/2000 | Parkinson et al. | |
| 6,070,673 A | 6/2000 | Wendte | |
| 6,212,453 B1 | 4/2001 | Kawagoe | |
| 6,377,889 B1 | 4/2002 | Soest | |
| 6,445,983 B1 | 9/2002 | Dickson et al. | |
| 6,539,303 B2 | 3/2003 | McClure et al. | |
| 6,789,014 B1 | 9/2004 | Rekow et al. | |
| 6,819,780 B2 | 11/2004 | Benson | |
| 6,865,465 B2 | 3/2005 | McClure | |
| 7,142,956 B2 | 11/2006 | Heiniger | |
| 7,277,792 B2 | 10/2007 | Overschie | |
| 7,431,325 B2 * | 10/2008 | Stahle | G01M 17/0074 280/727 |
| 7,437,230 B2 | 10/2008 | McClure | |
| 7,460,942 B2 | 12/2008 | Mailer | |
| 7,628,239 B1 * | 12/2009 | Louie | B62D 1/00 180/167 |
| 7,648,004 B1 | 1/2010 | Larouche | |
| 8,190,337 B2 | 5/2012 | McClure | |
| 8,589,013 B2 | 11/2013 | Pieper et al. | |
| 8,649,930 B2 | 2/2014 | Reeve et al. | |
| 9,164,508 B1 | 10/2015 | Takach, Jr. | |
| 9,996,081 B2 * | 6/2018 | Owens | G05D 1/021 |
| 2002/0072850 A1 | 6/2002 | McClure et al. | |
| 2004/0186644 A1 | 9/2004 | McClure et al. | |
| 2006/0149446 A1 * | 7/2006 | Nelson | B62D 1/02 701/41 |
| 2006/0167600 A1 | 7/2006 | Nelson, Jr. et al. | |
| 2010/0274452 A1 | 10/2010 | Ringwald et al. | |
| 2016/0214643 A1 | 7/2016 | Loughin | |
| 2018/0201299 A1 * | 7/2018 | Ashtari | B62D 1/00 |

OTHER PUBLICATIONS

"ATEX Certified Pneumatic Portable Valve Actuator", https://www.totallockout.com/expertise/valve-assist/pneumatic/pneumatic-windygun/, Nov. 2, 2017, pp. 1-7.

Noh, Kwang-Mo, "Self-tuning Controller for Farm Tractor Guidance"; Digital Repository @ Iowa State University, Retrospective Theses and Dissertations. Paper 9874; (1990); 192 pages.

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

International Search Report and Written Opinion; PCT/US2017/056770; dated Feb. 2, 2018.

International Preliminary Report on Patentability; PCT/US2017/056770; dated May 2, 2019.

* cited by examiner

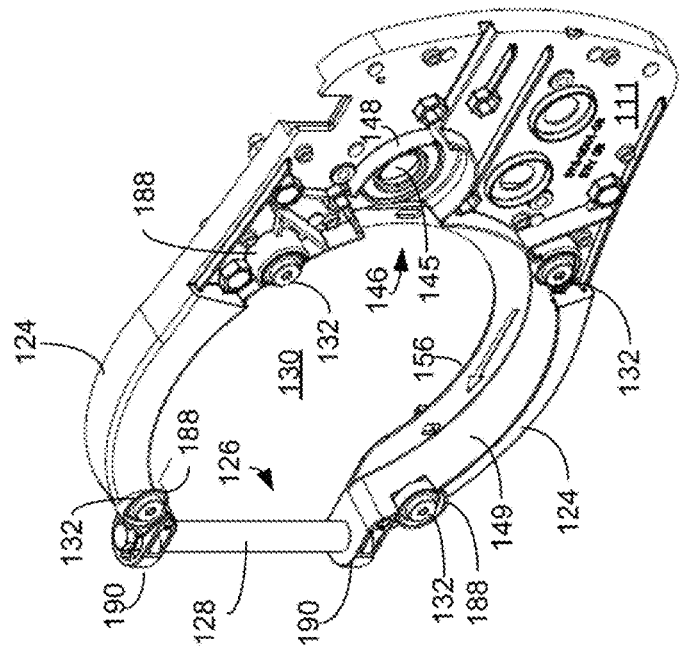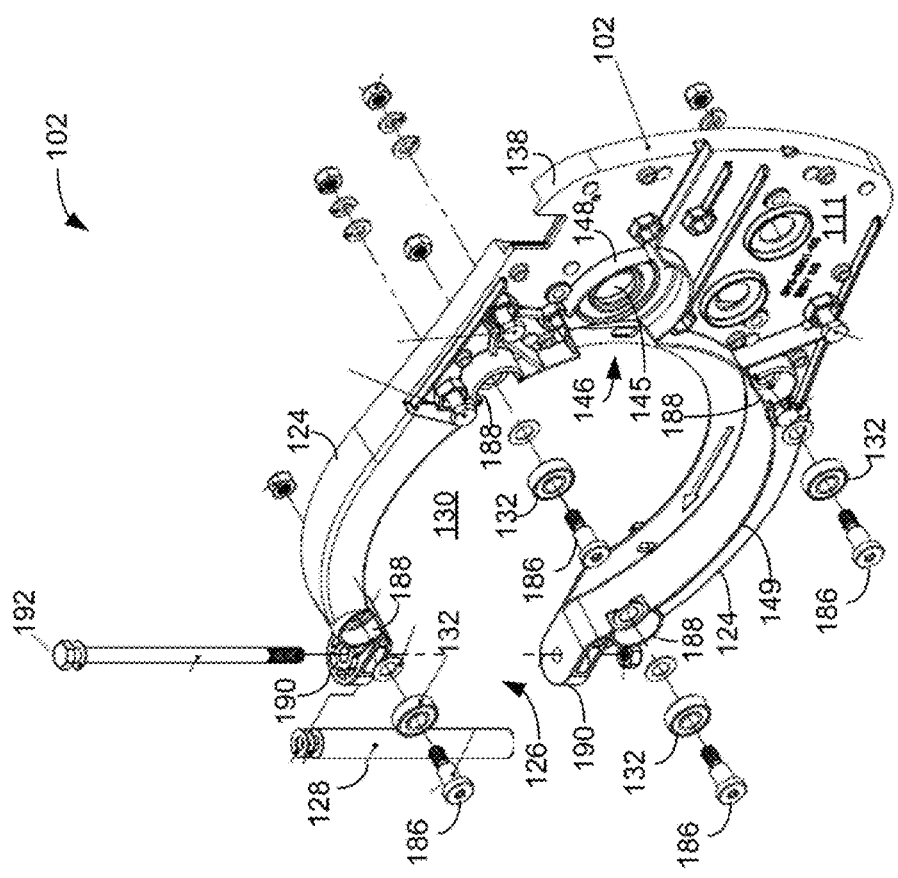
FIG. 10

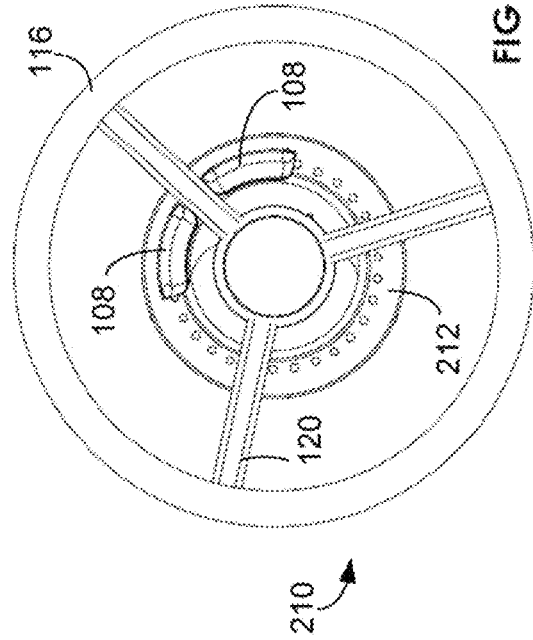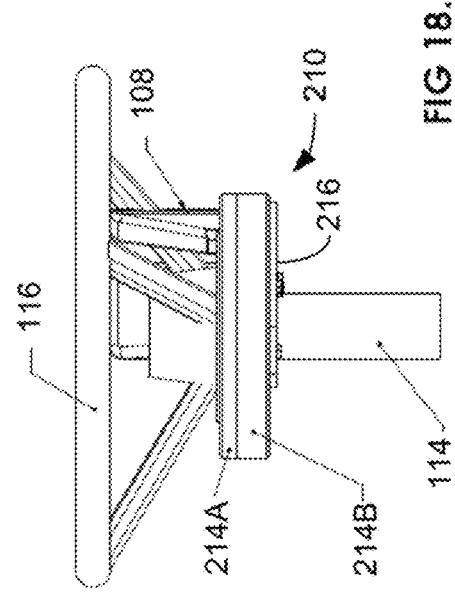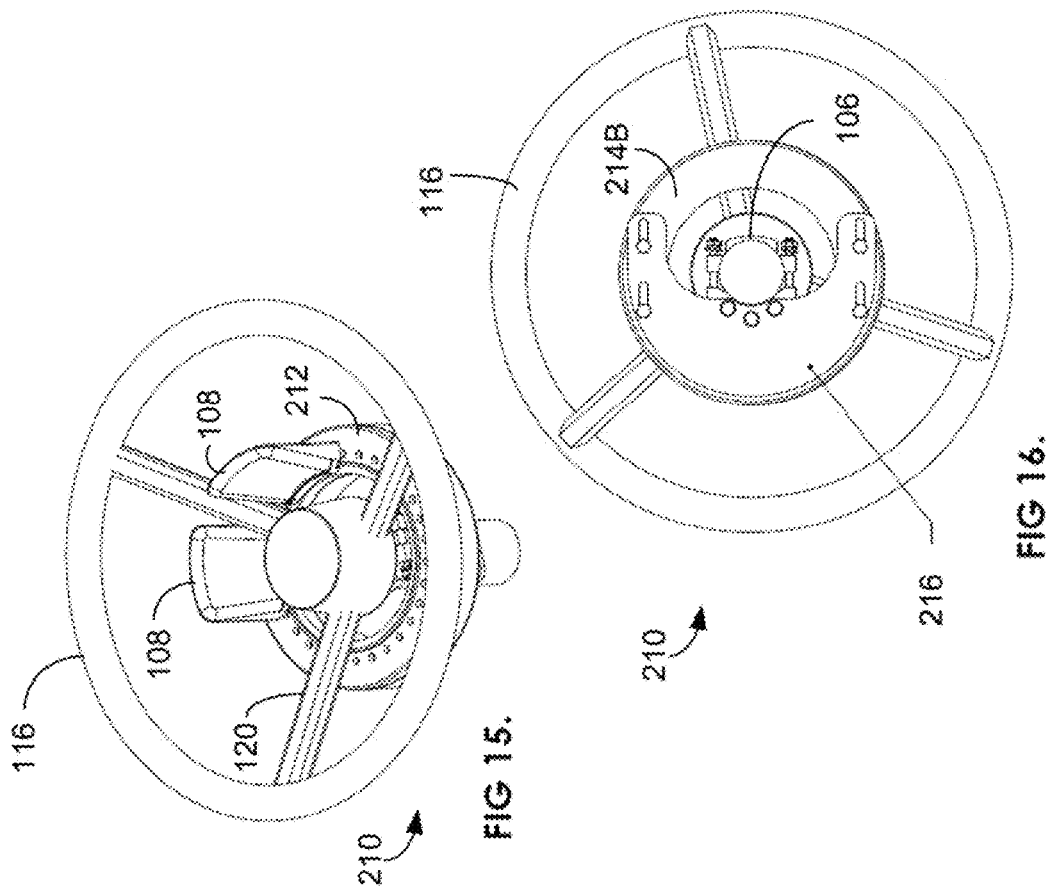

ACTUATOR FOR TURNING A STEERING WHEEL IN AUTOMATIC STEERING SYSTEMS

The present application claims priority to U.S. Provisional Patent Application Ser. No. 62/409,210 filed on Oct. 17, 2016, entitled: SYSTEM FOR TURNING A STEERING WHEEL FOR AN AUTO STEERING SYSTEM which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to steering wheel actuator mechanism.

BACKGROUND

Vehicles, such as farm vehicles, often include automatic steering systems to automatically steer along predetermined paths. Some automatic steering systems are installed after the vehicle is purchased. Retrofitting steering control systems is often complex and requires removing the steering wheel and attaching a special spline adapter to a steering wheel column. Some steering control systems may not fit in vehicles with certain console arrangements. Other steering control systems may obstruct the vehicle operator from normal hand placement on the steering wheel.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 10 is an isolated perspective view of a frame assembly with a removed top cover.

FIG. 15 is a perspective view of a steering wheel actuator mechanism that uses a direct drive motor.

FIG. 16 is a bottom view of the steering wheel actuator mechanism shown in FIG. 15.

FIG. 17 is a top view of the steering wheel actuator mechanism shown in FIG. 15.

FIG. 18 is a side view of the steering wheel actuator mechanism shown in FIG. 15.

DETAILED DESCRIPTION

A steering wheel actuator mechanism includes a frame assembly and a rotating assembly. The frame assembly is attached to a steering wheel column and the rotating assembly is attached around the steering wheel column and over the frame assembly. In one example, the frame assembly and the rotating assembly can be located around the steering wheel column without removing the steering wheel. The rotating assembly is inserted down into an opening formed in the frame assembly and rotationally engaged with a motor housed in the frame assembly. Actuators are attached to the rotating assembly and positioned to extend upwards through the steering wheel next to spokes in the steering wheel. The rotating assembly causes the actuators to move the spokes and rotate the steering wheel.

Figure 1:
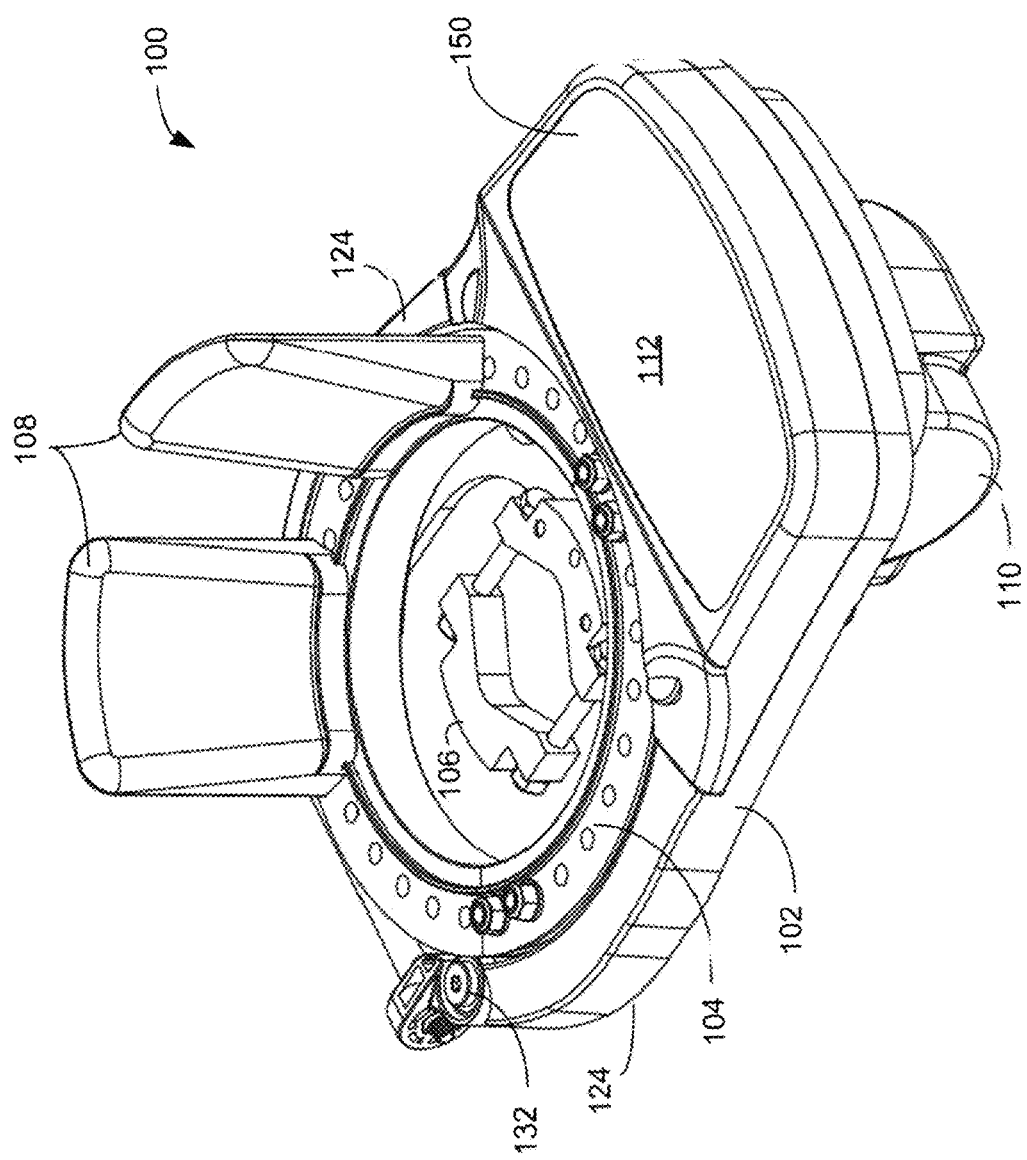
FIG. 1 is a perspective view of a steering wheel actuator mechanism.
Figure 2:
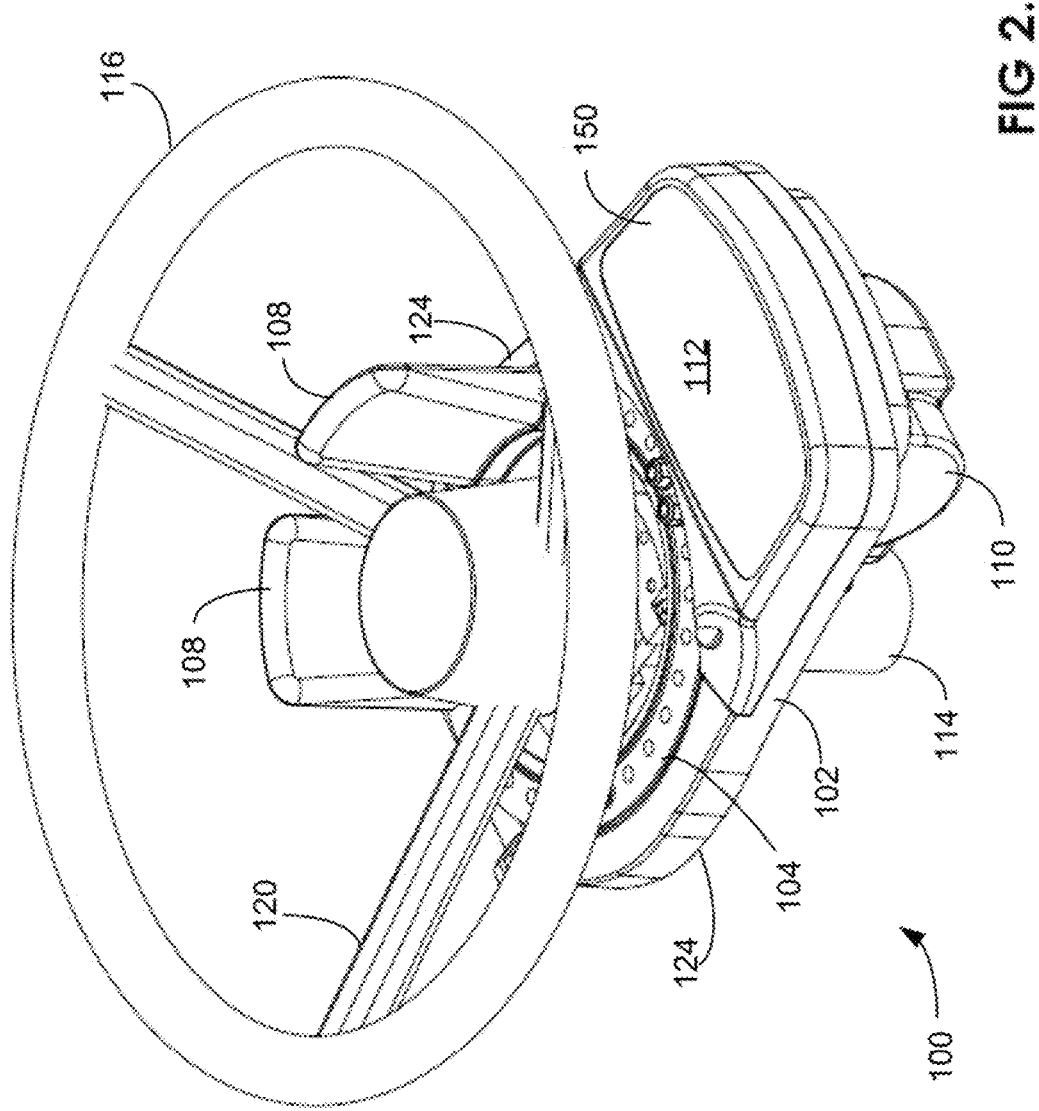
FIG. 2 is a perspective view of the steering wheel actuator mechanism attached to a steering wheel column.
Figure 3:
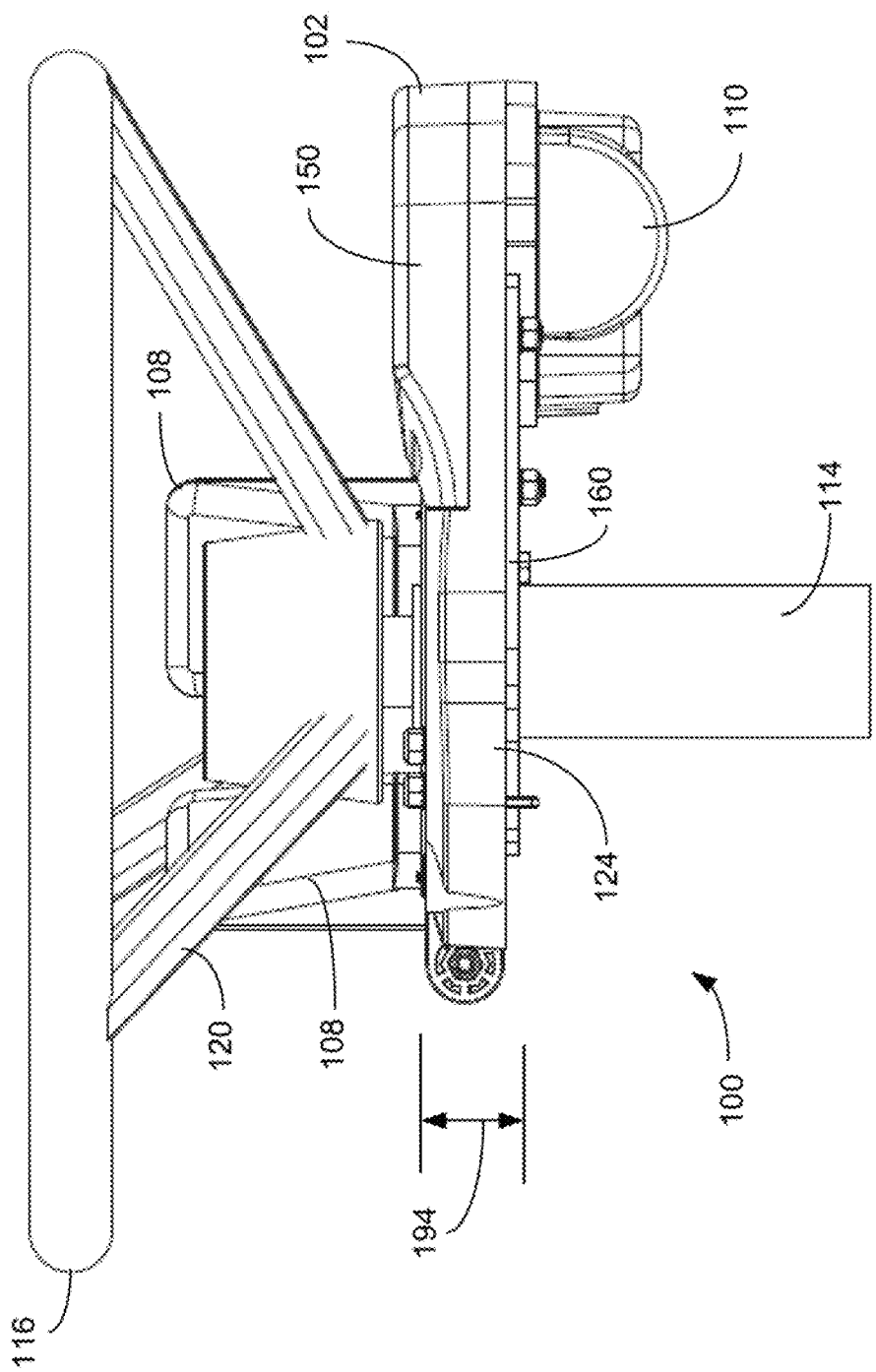
FIG. 3 is a side view of the steering wheel actuator mechanism.
Figure 4:
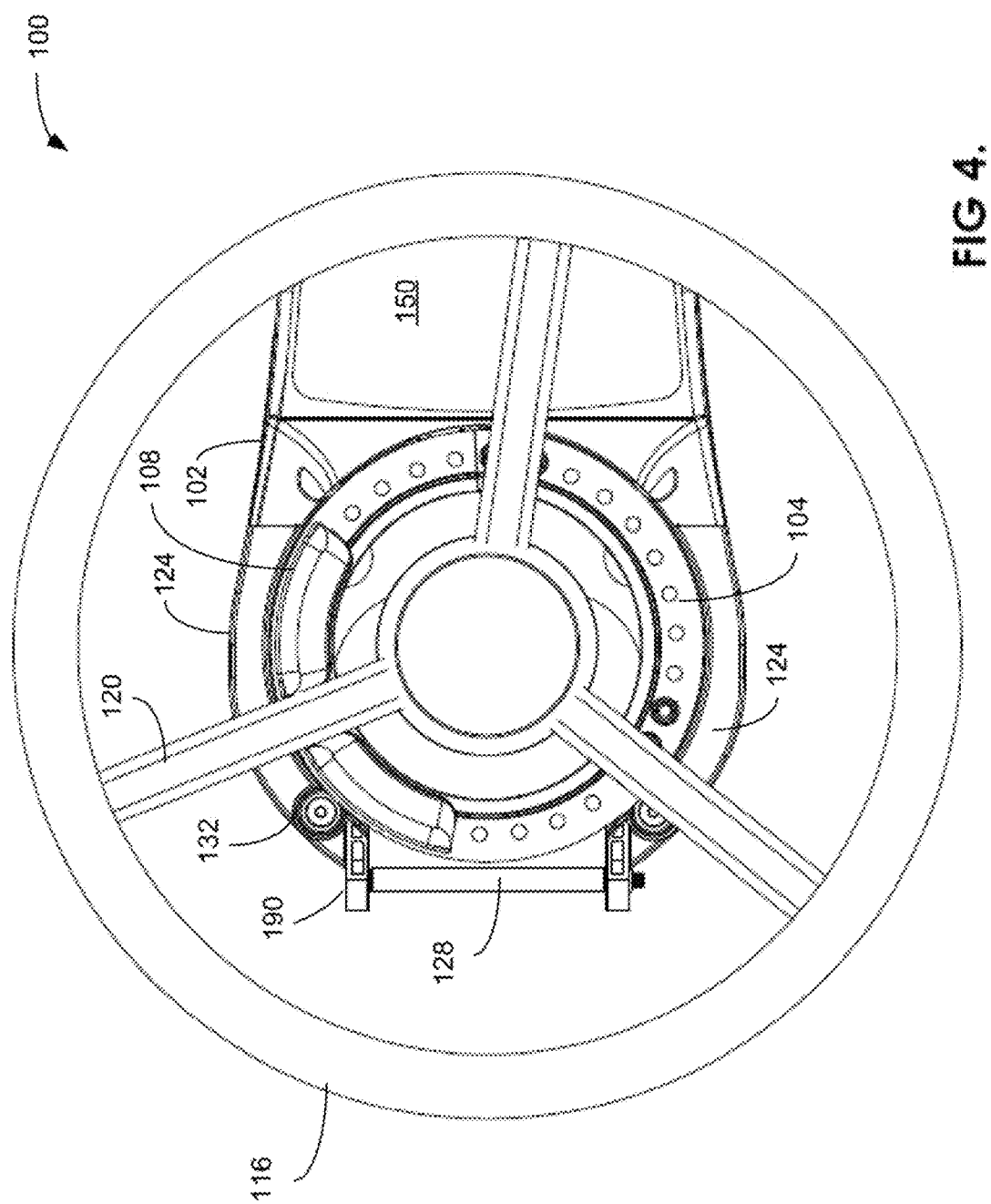
FIG. 4 is a top view of a steering wheel actuator mechanism.

FIGS. 1-4 show a steering wheel actuator mechanism 100 that attaches to a steering wheel 116. FIG. 1 is an isolated perspective view of actuator mechanism 100, FIG. 2 is a perspective view of actuator mechanism 100 attached to a steering wheel column 114, FIG. 3 is a side view of steering wheel actuator mechanism 100, and FIG. 4 is a top view of steering wheel actuator mechanism 100.

Referring to FIGS. 1-4, steering wheel actuator mechanism 100 includes a round frame assembly 102 that supports a round rotating assembly 104. Rotating assembly 104 is alternatively referred to as a gear assembly. A clamp 106 may attach to steering wheel column 114 and hold frame assembly 102 and rotating assembly 104 below steering wheel 116. Actuators 108 are bolted to gear assembly 104 and extend vertically up between spokes 120 in steering wheel 116. Frame assembly 102 may include a top cover or enclosure 150 that may house a display screen and/or buttons for a user interface 112 that controls a motor 110. Motor 110 rotates gear assembly 104 causing actuators 108 to turn steering wheel 116 either clockwise or counter clockwise.

Figure 5:
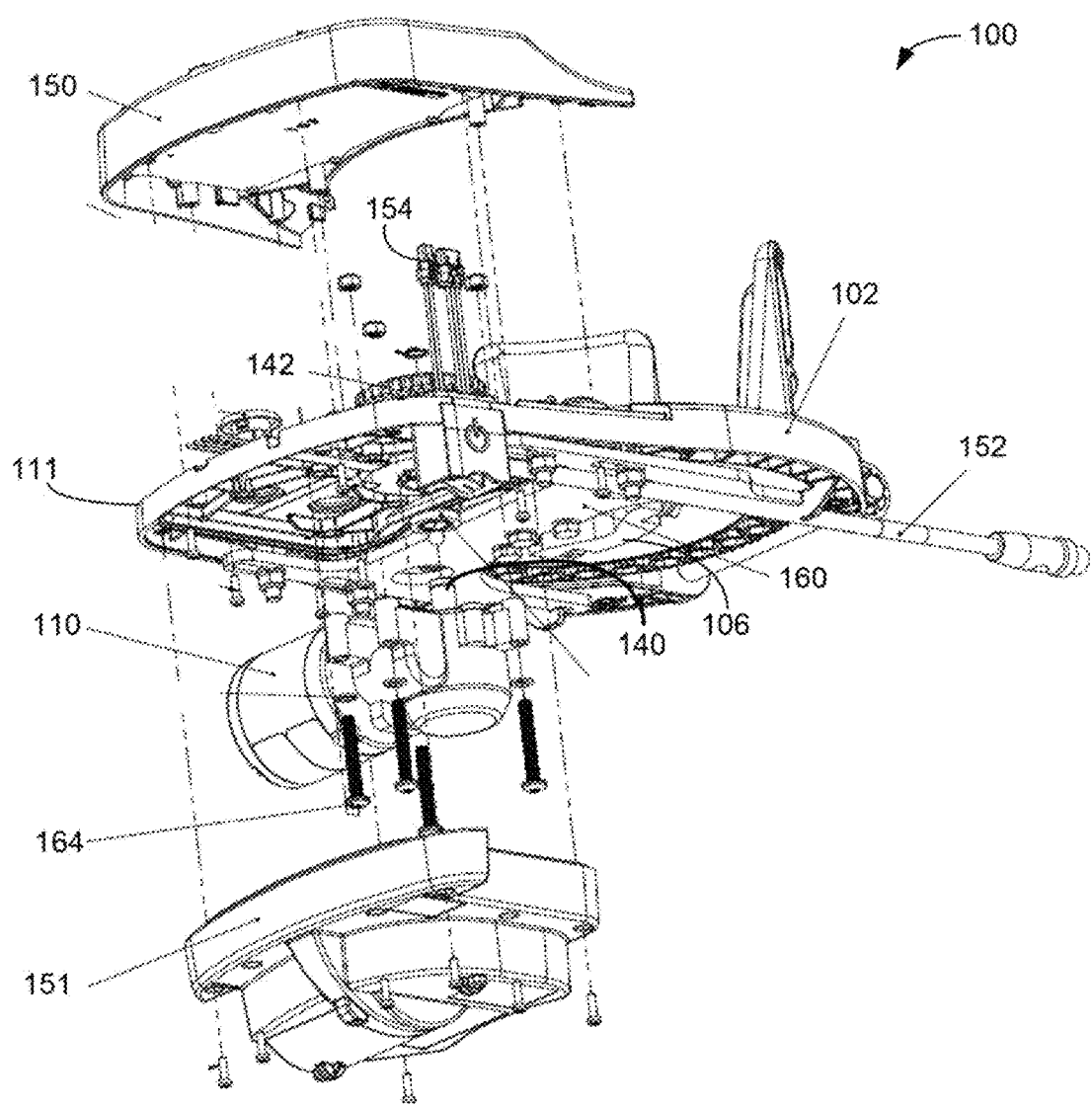
FIG. 5 is an exploded view of the steering wheel actuator mechanism.
Figure 6:
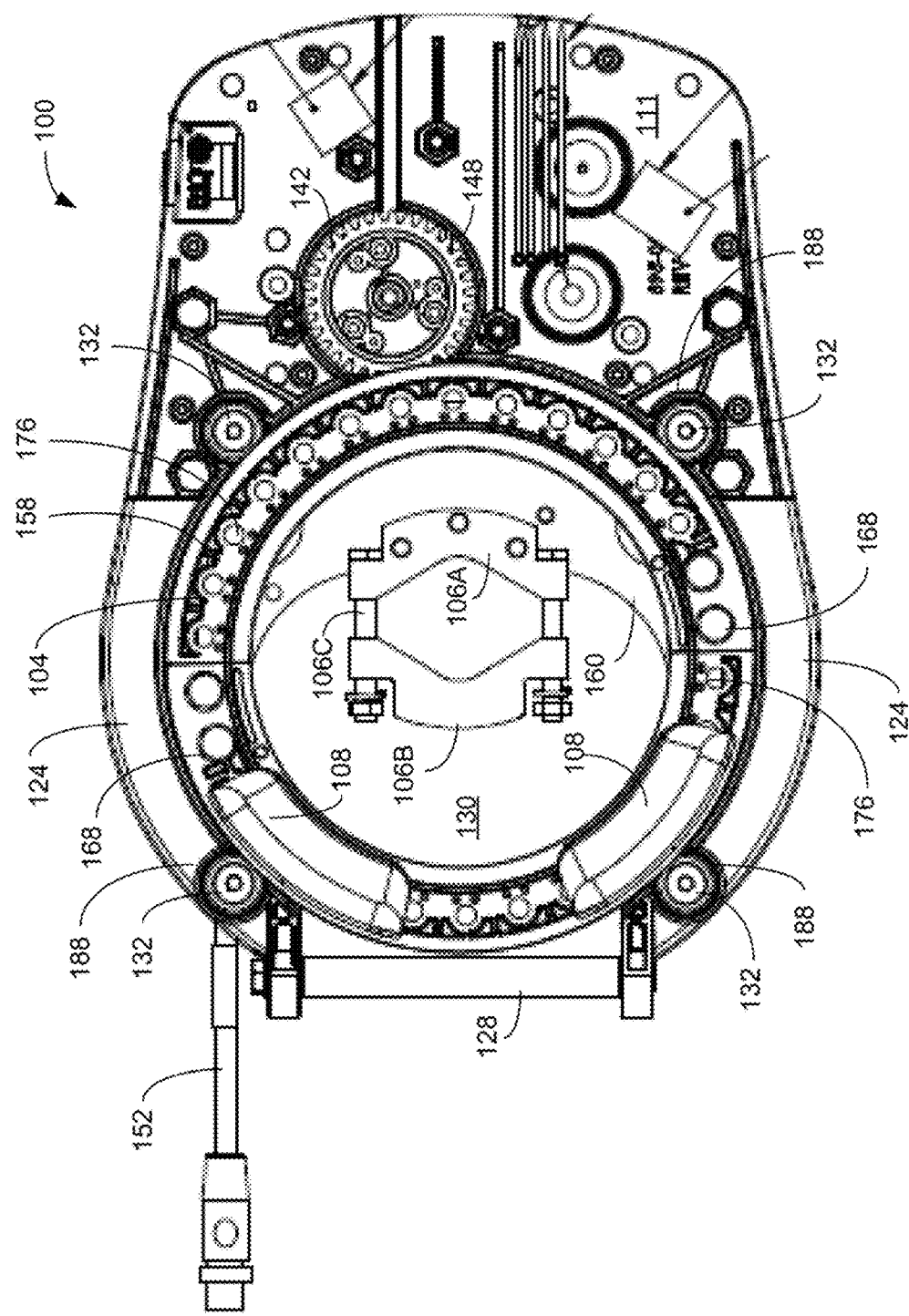
FIG. 6 is a top view of the steering wheel actuator mechanism with a removed top cover.
Figure 8:
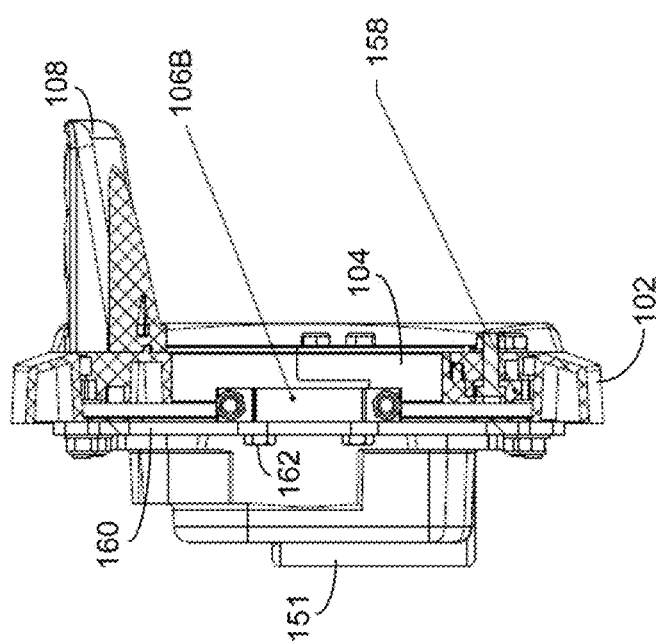
FIG. 8 is a front sectional view of the steering wheel actuator mechanism that shows the bracket and clamp that attaches to the steering wheel column.
Figure 7:
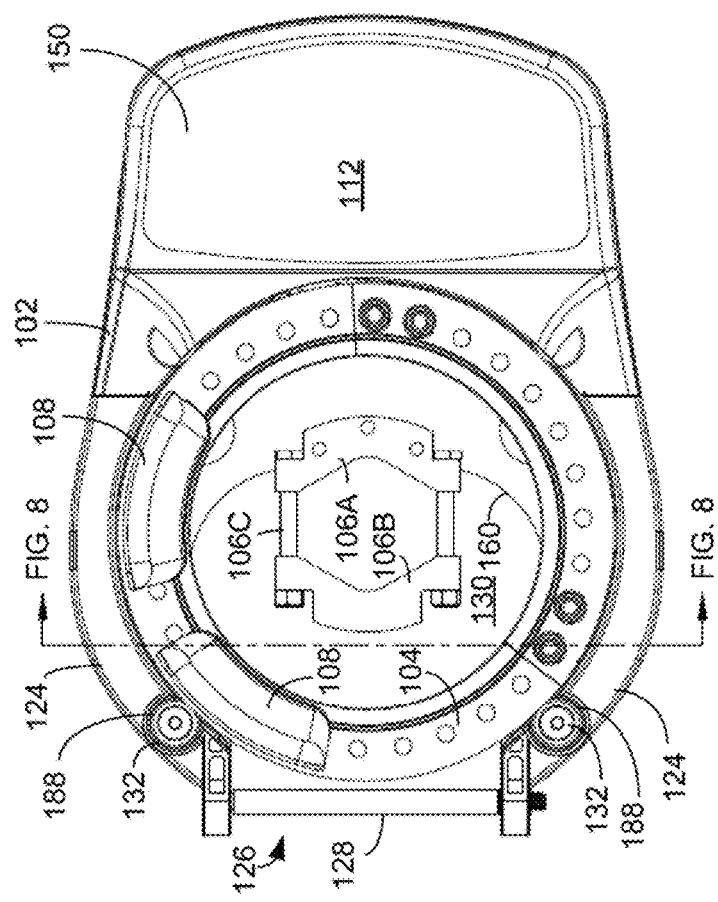
FIG. 7 is a top view of a bracket and clamp that attach the steering wheel actuator mechanism to a steering wheel column.
Figure 9:
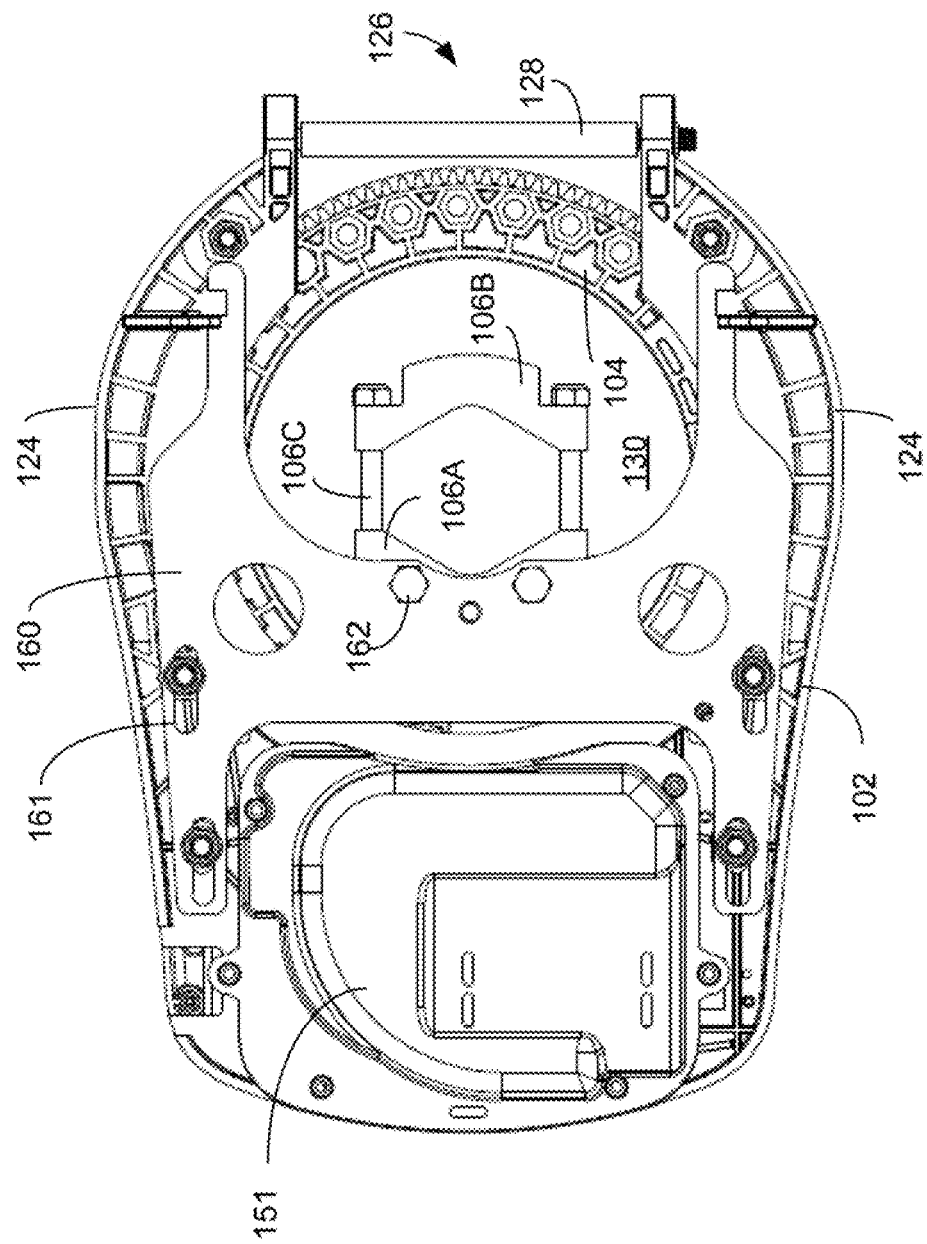
FIG. 9 is a bottom view of the steering wheel actuator mechanism that shows the bracket and clamp that attaches to the steering wheel column.
Figure 11:
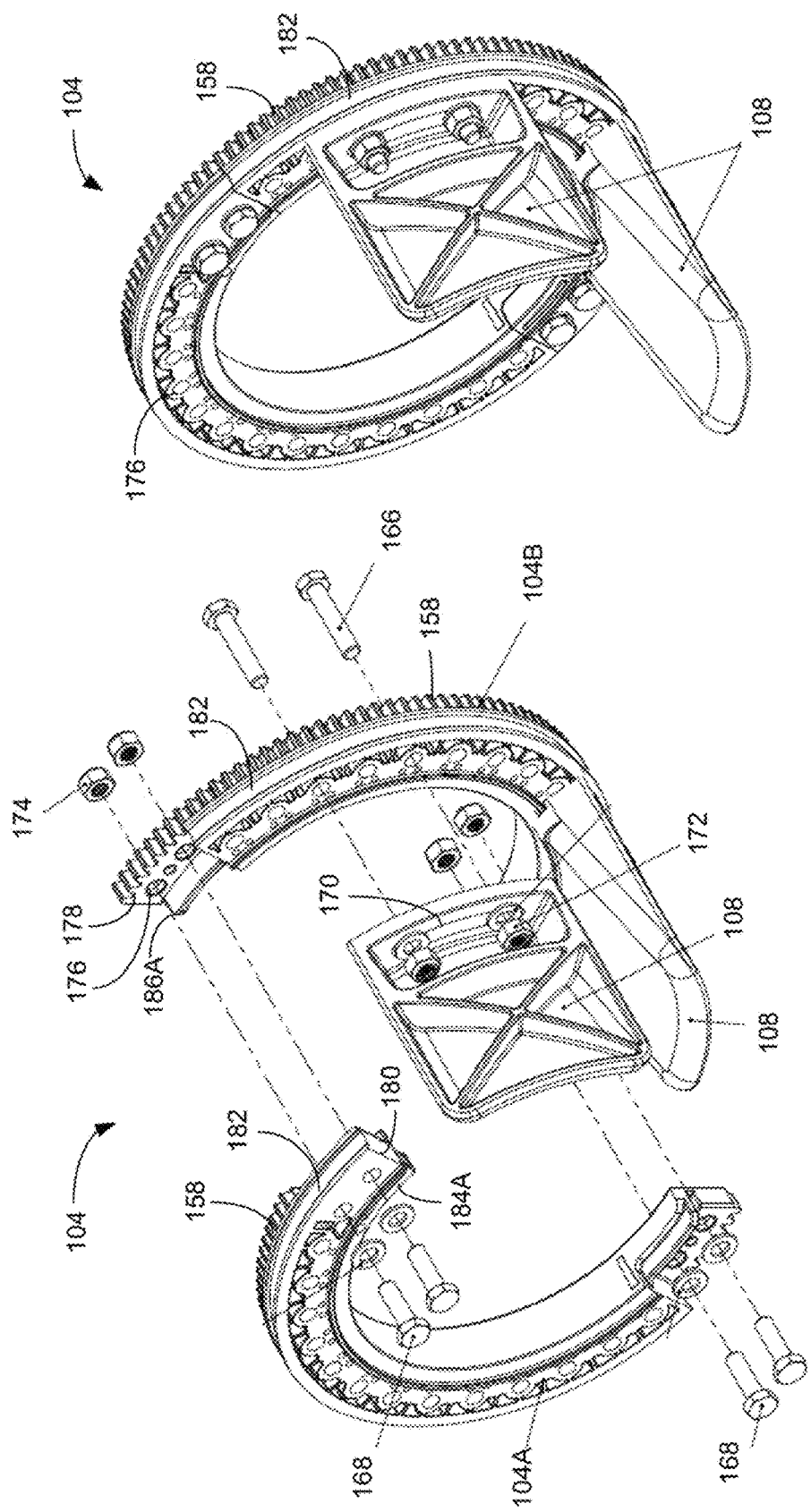
FIG. 11 is an isolated perspective view of a gear assembly that inserts into the frame assembly of FIG. 10.
Figure 12:
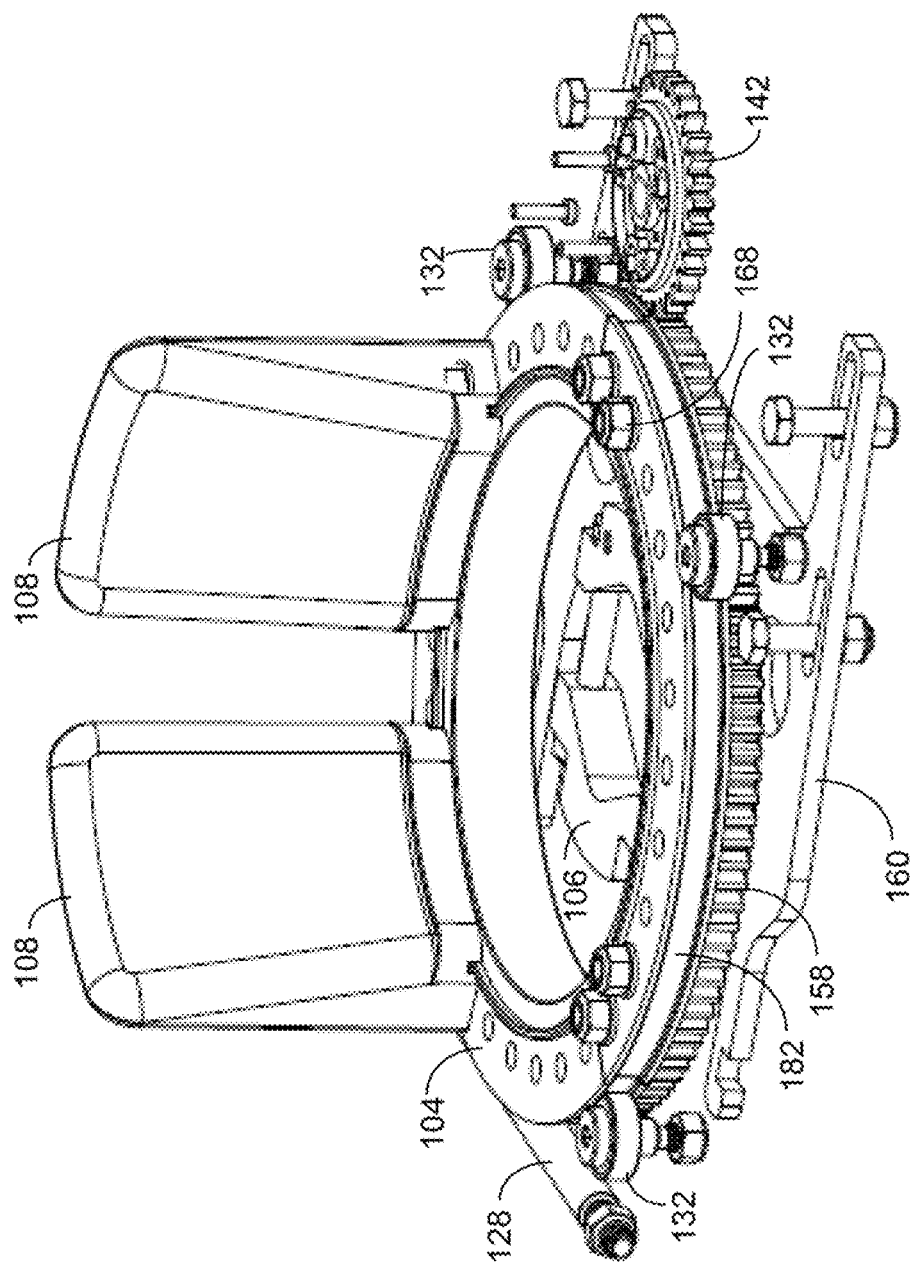
FIG. 12 is an isolated perspective view of the gear assembly with related actuator mechanism components.

FIG. 5 is an exploded view of steering wheel actuator mechanism 100, FIG. 6 is a top view of steering wheel actuator mechanism 100 with a removed top cover 150, FIG. 7-9 show different views of a clamp assembly, FIG. 10 shows a perspective isolated view of frame assembly 102, and FIGS. 11 and 12 show isolated views of rotating assembly 104.

Referring to FIGS. 5-12, frame assembly 102 may include oppositely opposing semi-circular arms 124 forming a circular center region 130 and a front opening 126 for receiving steering wheel column 114. A spacer 128 is located in opening 126 in between opposite front ends of arms 124. Gear assembly 104 seats into opening 130 and is rotationally held in-between arms 124 by bearings 132 that are located in four opposing quadrants of frame assembly 102. Bolts 168 insert through holes 176 formed in gear assembly 104 and hold two detachable pieces of gear assembly 104 together.

Motor 110 may be a DC electric motor that includes a shaft 140 that extends up through a hole 145 formed in a back section 111 of frame assembly 102 and couples to a gear 142. Gear 142 sits in a cavity formed by walls 148 that extend up from a top surface of frame assembly section 111. Gear 142 extends through an opening 146 formed in a wall 149 that extends up from around circular opening 130 and engages with teeth 158 that extend around the lower outside perimeter of gear assembly 104.

In other examples, rotating assembly 104 may not be directly connected to gear 142. For example, a chain or belt drive may wrap around both gear 142 and rotating assembly 104. In another example, a friction drive may include a rubber or plastic wheel attached to motor 110 that presses against an outside perimeter of rotating assembly 104. In another example that eliminates the need for gears, the motor 110 may be replaced by a direct drive motor fully integrated into the frame 102 and concentric to the steering column 114 with a large rotor output that replaces the gear 104.

Top enclosure or cover 150 sits down over the top of back section 111 and contains the electronics and electrical connections for controlling motor 110 and operating user interface 112. A bottom cover 151 sits over motor 110 and attaches to the back side of frame assembly back section 111. A power and control cable 152 includes the control and power lines used for powering and controlling motor 110 and user interface 112 and includes a connector 154 for plugging into the electronics contained in enclosure 150.

A bracket 160 includes oblong holes 161 that receive bolts for attaching bracket 160 to the bottom of frame assembly 102. Holes 161 allow bracket 160 to be aligned so gear assembly 104 is concentrically aligned with steering wheel column 114. Bolts 162 attach clamp 106 to bracket 160 and hold clamp 106 up into circular opening 130 in frame assembly 102. In one example, clamp 106 may be substantially co-planer with teeth 158 in the lower layer of gear assembly 104. Recessing clamp 106 up into opening 130 reduces the overall depth of steering wheel actuator mechanism 100.

Clamp 106 may include a first clamp member 106A that bolts to the top surface of bracket 160 via bolts 162. A second clamp member 106B is attached to clamp member 106A with bolts 106C. Clamp member 106A may fit around the front side of steering wheel column 114 and clamp member 106B may fit around the back end of steering wheel column 114. Bolts 106C are then tightened pressing clamp members 106A and 106B against steering wheel column 114 and supporting frame assembly 102.

Circular slots 188 are formed on the top side of frame assembly 102 to retain circular bearings 132. Bolts 186 are inserted through concentric holes extending through the middle of bearings 132, slots 188, and frame assembly 102. Bolts 186 rotationally retain bearings 132 inside of slots 188. Bearings 132 may be located in different 90-degree positions in a circle around opening 130 and extend laterally through openings in wall 149.

Referring specifically to FIGS. 11 and 12, gear assembly 104 includes two sections 104A and 104B that are held together with bolts 168 and threadingly interlocking nuts 174. In one example, gear sections 104A and 104B may be substantially equal halves of a circle. In other examples, one of gear sections 104A or 104B may form a larger portion of the circle, such as two thirds of the circle, and the other gear section may form be a smaller portion of the circle, such as one third of the circle.

Each gear portion 104A and 104B may include a semi-circular lower gear layer 178 formed with an upper semi-circular mounting layer 180. Teeth 158 are formed on the outer perimeter of gear layer 178 and a concave semi-circular channel/groove/race 182 is formed on the outside perimeter of upper mounting layer 180. Holes 176 extend in a circle through and around both lower gear layer 178 and upper mounting layer 180.

Gear section 104A includes oppositely notched ends that mate with corresponding oppositely notched ends of gear section 104B. For example, mounting layer 180 may extend further out from a first end 184A of gear section 104A than gear layer 178. Correspondingly, gear layer 178 extends further out from a first end 186A of gear section 104B than mounting layer 180. The two ends are overlayed over each other and are then held together with bolts 168 to form a continuous circular gear assembly 104.

Actuators 108 are bolted to the top of gear sections 104A and/or 104B with bolts 166. Actuators 108 also include curved slots 170 that extend longitudinally along a same circular axis as gear assembly 104. Bolts 166 are inserted through holes 176 and slots 170 and loosely screwed to nuts 172. Actuators 108 are then slide up against a spoke 120 of steering wheel 116 as shown in FIGS. 2-4. Nuts 172 are then tightened on bolts 166 holding actuator 108 firmly against the top face of gear assembly 104 and against the sides of spoke 120.

Concave channel 182 extends around the outside perimeter of mounting layer 180 above teeth 158 formed in lower gear layer 178. Arms 124 may be slightly pulled further apart and gear assembly 104 inserted down into circular frame opening 130. Bearings 132 then snap into channel 182 suspending gear assembly 104 within circular opening 130 between arms 124. During insertion, gear 142 (FIGS. 5, 6, and 12) interlocks with teeth 158 on gear assembly 104.

INSTALLATION

Referring to FIGS. 1-12, either initially from the factory or during installation, spacer 128 and gear assembly 104 may be detached from frame assembly 102. Frame assembly 102 is positioned underneath steering wheel 116. Front opening 126 in frame assembly 102 is moved around steering wheel column 114. Clamp 106A is pressed against a front side of steering wheel column 114 and clamp 106B is inserted into bolts 106C and clamped against the back side of steering wheel column 114. At this point, frame assembly 102 is suspended underneath steering wheel 116 by bracket 160.

Sections 104A and 104B of gear assembly 104 are placed around steering wheel column 114 underneath steering wheel 116 and above suspended frame assembly 102. Gear layer 178 of gear assembly 104 is facing downward. Gear sections 104A and 104B are then bolted together forming a circular ring around steering wheel column 114.

In one example, both frame assembly 102, gear assembly 104, and actuators 108 are made of plastic, and at least frame assembly 102 is made from a semi-pliable/bendably plastic material or are hinged. This allows arms 124 to be slightly spread apart to receive gear assembly 104. Gear assembly 104 is inserted down in-between spread apart arms 124 so that bearings 132 that extend around the outside perimeter of upper mounting layer 180 seat into channel 182. Arms 124 are released so bearings 132 are allowed to suspend gear assembly 104 within frame assembly 102.

Spacer 128 is inserted between lips 190 and bolt 192 is inserted through holes in lips 190 and bolt 192. A nut is threadingly engaged with an opposite end of bolt 192 pulling lips 190 on opposing arms 124 against opposite longitudinal ends of spacer 128. At this point, gear assembly 104 is concentrically aligned with steering wheel column 114 and circular opening 130 in frame assembly 102. Outside perimeter teeth 158 in gear assembly 104 are also engaged with gear 142 that is attached to motor 110.

Bolts 166 are inserted through holes 176 from the back side of gear assembly 104. A first actuator 108 is placed on top of gear assembly 104 so two bolts 166 insert through slot 170. The first actuator 108 is positioned against a first lateral side of one steering wheel spoke 120 and the bolts 166 secured with nuts.

A second set of bolts 166 are inserted through holes 176 from the back side of gear assembly 104. A second actuator 108 is placed on top of gear assembly 104 and positioned on a second lateral side of the same or a different steering wheel spoke 120. The second set of bolts 166 are inserted into slot 170 and the second actuator 108 pressed up against one of spokes 120. Bolts 166 are screwed down with nuts clamping second actuator 108 against the second opposite lateral side of spoke 120.

Gear 142 on motor 110 rotates gear assembly 104 relative to frame assembly 102. Rotation of gear assembly 104 also rotates actuators 108 and asserts force against one of the opposite lateral sides of spoke 120 rotating steering wheel 116.

In one example, steering wheel actuator mechanism 100 uses actuators 108 to turn the steering wheel 116 on any type of vehicle including automobiles, farm vehicles, tractors, boats, trucks, buses, mowers, golf carts, ATVs, etc. for purposes of AutoPilot, AutoSteer or remote control. Through rotation of the steering wheel, the vehicle can be steered to follow a desired path.

Cable 152 is connected to a battery and to an automatic steering control system. In one example, the automatic steering control system may include a global positioning system (GPS) and an inertial measurement unit (IMU) that detect the position, speed, and heading of the vehicle. The automatic steering control system may send steering commands through cable 152 for controlling motor 110 and the rotation of steering wheel 116.

Steering control systems that automatically steer vehicles using GPS/INS technology over destination paths are described in U.S. Pat. No. 7,142,956, issued Nov. 28, 2006, entitled: AUTOMATIC STEERING SYSTEM AND METHOD; U.S. Pat. No. 7,689,354, issued Mar. 30, 2010, entitled ADAPTIVE GUIDANCE SYSTEM AND METHOD; U.S. Pat. No. 7,835,832, Nov. 16, 2010, entitled: VEHICLE CONTROL SYSTEM; and U.S. Pat. No. 7,437,230, issued Oct. 14, 2008, entitled: SATELLITE BASED VEHICLE GUIDANCE CONTROL IN STRAIGHT AND CONTOUR MODES, which are all herein incorporated by reference in their entireties.

Figure 13:
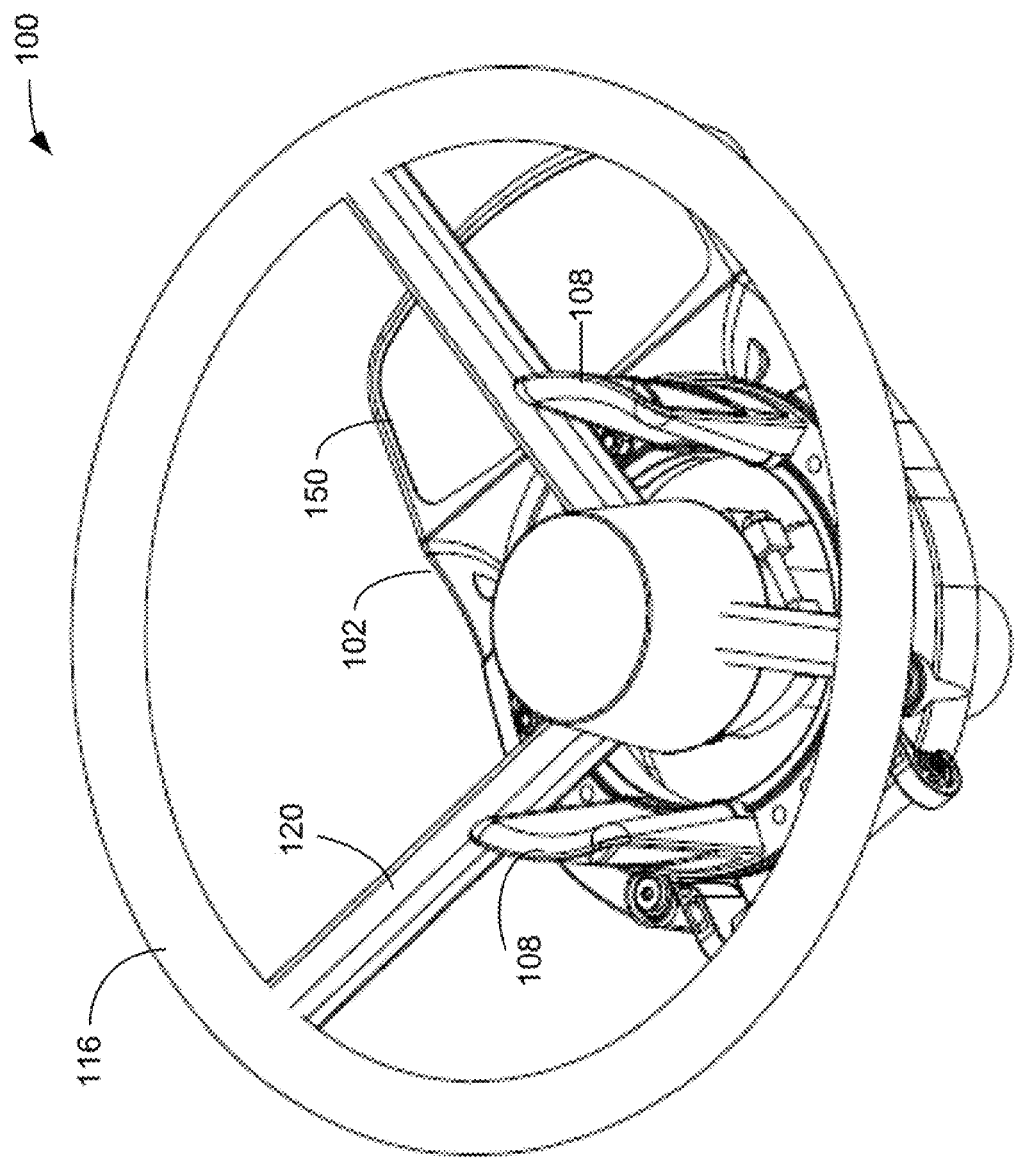
FIG. 13 is a perspective view of the steering wheel actuator mechanism with an alternative actuator arrangement.

FIGS. 2-4 show one example of how actuators 108 are positioned relative to spoke 120. However, other actuators can also rotate any other type of steering wheel in clockwise and counter-clockwise directions. For example, FIG. 13 shows one actuator 108 located on the left side of a first spoke 120 and a second actuator 108 may be located on the right side of a second spoke 102. In another example, instead of the short lateral sides, the elongated sides of actuators 108 may press against opposite sides of spoke 120.

In another example, a single actuator 108 may have oppositely extending arms that extend out in opposite directions to press against opposing lateral sides of adjacent spokes 120. The arms of the single actuator 108 also may extend inward so inside actuator faces press against opposing lateral sides of a same spoke 120.

In yet another example, actuator 108 may include a ring, hook, or strap that loops around the spoke 120 so a single actuator 108 can both pull and push a same spoke 120 in both clockwise and counter-clockwise directions. In other examples, actuator 108 is not necessarily a substantially flat curved shape as shown above. For example, actuators 108 may comprise cylindrical posts or any other shape that extends vertically up from gear assembly 104.

In one example, steering wheel actuator mechanism 100 can be installed without having to remove steering wheel 116. Thus, installation is faster and easier to install compared to other after-market automatic steering actuators that require steering wheel removal and further installation of a steering wheel spline adapters.

Figure 14:
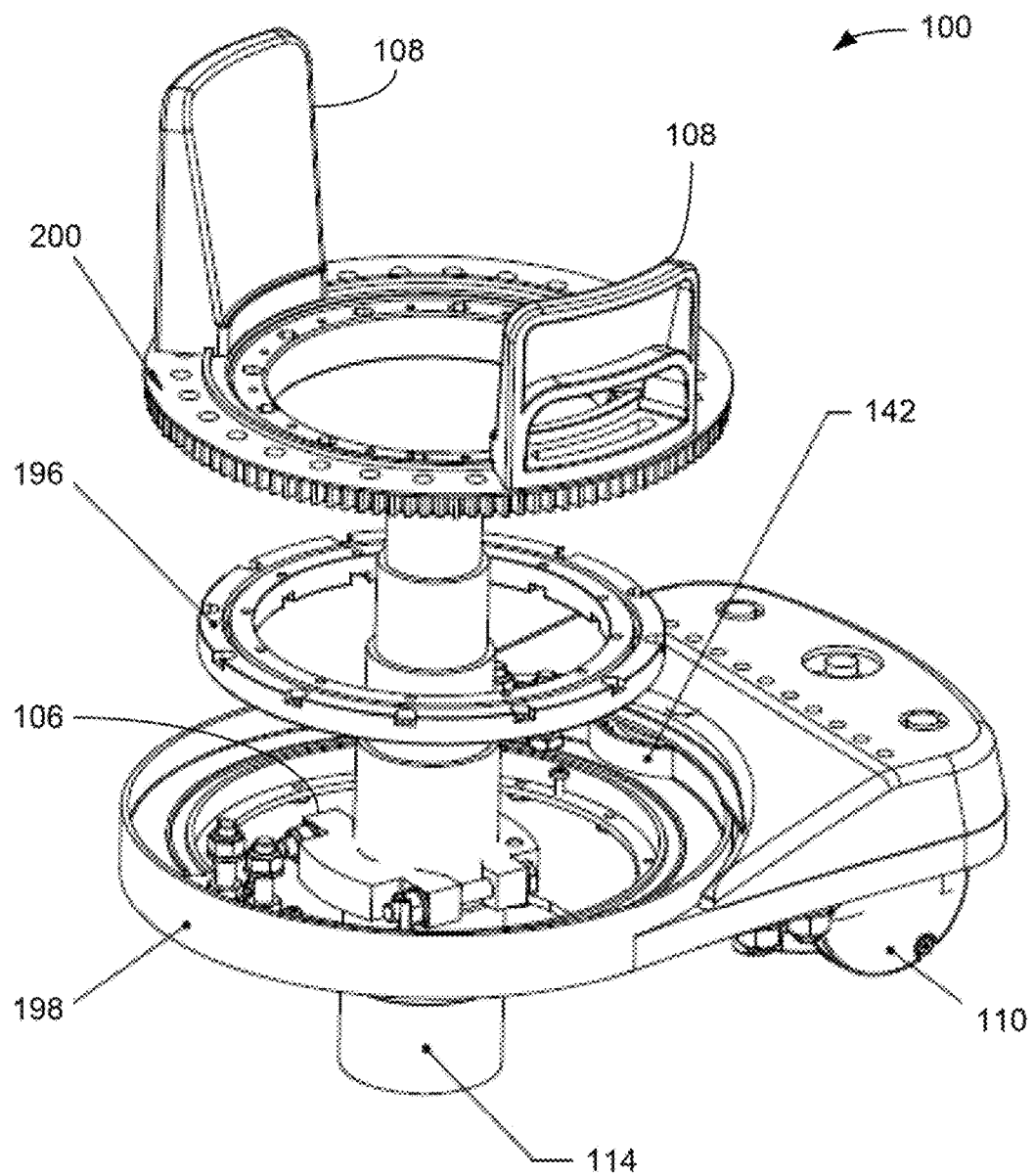
FIG. 14 shows a steering wheel actuator mechanism that uses unitary frame and rotating assemblies and an alternative bearing device.

FIG. 14 shows another example unitary single piece gear assembly 200 that inserts into a single piece frame assembly 198. In this example, steering wheel 116 might need to be removed in order to insert frame assembly 198 and gear assembly 200 over and around steering wheel column 114. In this example, the four bearings 132 are replaced with a unitary thin circular section bearing 196. Gear assembly 200 is a one-piece gear and frame assembly 198 does not include front opening 126 shown above in FIGS. 1-13. The steering wheel actuator mechanism in FIG. 14 also may include different shaped actuators 108 and has the advantage of possibly using fewer parts and therefore being less expensive to manufacture.

FIGS. 15-18 show another example steering wheel actuator mechanism 210 where a direct drive motor replaces the motor and gears described above. FIG. 15 is a perspective view of steering wheel actuator mechanism 210, FIG. 16 is a bottom view of steering wheel actuator mechanism 210, FIG. 17 is a top view of the steering wheel actuator mechanism 210, and FIG. 18 is a side view of steering wheel actuator mechanism 210. The motor may be an electric motor.

Steering wheel actuator mechanism 210 includes a rotating member 212 similar to rotating member 104 described above. Rotating member 212 is located under steering wheel 116 and supports and rotates actuators 108 that rotate steer wheel spokes 120. A direct drive motor 214 rotates rotating member 212 and includes a substantially flat rotor 214A and stator 214B that each have concentric circular openings for receiving steering wheel column 114.

One or two thin bearings are located between stator 214B and rotor 214A. Rotor 214A supports rotating member 212 and contains permanent magnets that rotate in response to activation of coils located in stator 214B. A bracket 216 is attached to the bottom of stator 214B and a clamp 106 is bolted to bracket 216 and attaches stator 214B to steering wheel column 114.

Steering wheel actuator mechanisms shown above all have a relatively thin product profile. For example, the overall relatively shallow overall depth 194 of the front portion as shown in FIG. 3 allows installation in a larger number of vehicles. For example, some vehicles may include consoles that extend up relatively close to steering wheel 116. Shallow depth 194 allows steering wheel actuator mechanism 100 to attach in-between the relatively small spaces that may exist between a console and steering wheel 116.

Extending actuators 108 up through the middle of steering wheel 116, allows steering wheel actuator mechanism 100 to turn steering wheel 116 without mounting anything on or outside of steering wheel 116. Thus, steering wheel actuator mechanism 100 does not obstruct the locations where an operator may place their hands on steering wheel 116. Steering wheel actuator mechanism 100 can turn steering wheels with any number, configuration, spacing, etc. of spokes.

Steering wheel actuator mechanism 100 uses a very simple technique for turning steering wheel 116 and therefore uses fewer parts, is less expensive to manufacture, and easier to install. As mentioned above, steering wheel actuator mechanism 100 does not require the spline adapters or steering wheel adapters used by other steering systems and can be installed using the original factory steering wheel without further modifications. The steering wheel actuator mechanism 100 can be installed using a single sized wrench.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

Some of the operations described above may be implemented in software and other operations may be implemented in hardware. One or more of the operations, processes, or methods described herein may be performed by an apparatus, device, or system similar to those as described herein and with reference to the illustrated figures.

It will be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations.

Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A steering wheel actuator mechanism, comprising:
    a frame assembly that attaches around a steering wheel column;
    a rotating assembly that rotates within the frame assembly; and
    one or more actuators that extend up from the rotating assembly and through a steering wheel located on the steering wheel column and turn the steering wheel.

2. The steering wheel actuator mechanism of claim 1, wherein the actuators press against one or more steering wheel spokes to turn the steering wheel.

3. The steering wheel actuator mechanism of claim 1, wherein a first one of the actuators is located on a first lateral side of one of the spokes and a second one of the actuators is located on a second opposite lateral side of one of the spokes.

4. The steering wheel actuator mechanism of claim 1, wherein the actuators include slots that receive bolts that extend through the rotating assembly clamping the actuators into different circumferential positions relative to the rotating assembly.

5. The steering wheel actuator mechanism of claim 1, wherein at least one of the actuators extends around one of the spokes of the steering wheel.

6. The steering wheel actuator mechanism of claim 1, wherein the frame assembly includes:
    two opposing arms that extend around the steering wheel column forming a central opening for receiving the rotating assembly; and
    a spacer that connects front ends of the two opposing arms together in front of the steering wheel column.

7. The steering wheel actuator mechanism of claim 6, wherein the two opposing arms are at least partially bendable or hinged to pull apart and receive the rotating assembly and then move back into an original position to hold the rotating assembly.

8. The steering wheel actuator mechanism of claim 1, wherein:
    the rotating assembly is concentrically aligned with a circular opening in the frame assembly; and
    the rotating assembly includes teeth or a channel extending around an outside perimeter that engages with a motor gear, chain, or belt that is coupled to a motor.

9. The steering wheel actuator mechanism of claim 8, including:

a bracket attached to a bottom surface of the frame assembly; and a clamp attached to a top face of the bracket that extends up into a circular opening formed in the frame assembly in a substantially co-planar alignment with the teeth or channel on the outside perimeter of the rotating assembly.

10. The steering wheel actuator mechanism of claim 1, wherein the frame assembly is attached to the steering wheel column and the rotating assembly inserted into the frame assembly around the steering wheel column without removing the steering wheel.

11. An apparatus for rotating a steering wheel, comprising:

a frame assembly including a central opening to extend around a steering wheel column;

a rotating assembly configured to insert into and rotate within the central opening in the frame assembly; and one or more actuators attached to the rotating assembly and extending up against the steering wheel.

12. The apparatus of claim 11, including:

a bracket attached to a bottom side of the frame assembly; and a clamp attached to a top side of the bracket to attach to the steering wheel column and extend up into the central opening in the frame assembly in a substantially coplanar alignment with at least a portion of the rotating assembly.

13. The apparatus of claim 11, wherein the frame assembly includes:

two opposing arms that extend around the steering wheel column forming the central opening and front ends forming a front opening for receiving the steering wheel column; and a spacer that connects the front ends of the two opposing arms together.

14. The apparatus of claim 13, wherein the frame assembly further includes an enclosure extending between back ends of the two arms that contains a user interface.

15. The apparatus of claim 11, further comprising:

a motor attached underneath the frame assembly; and a shaft connecting the motor to a gear rotationally coupled to the rotating assembly.

16. The apparatus of claim 11, includes multiple holes extending through the rotating assembly in a substantially round circle for receiving bolts that hold the actuators to selectable circular positions along a top face of the rotating assembly.

17. The apparatus of claim 16, wherein the actuators include elongated slots for receiving the bolts.

18. The apparatus of claim 11, wherein the rotating assembly includes at least two semi-circular sections attachable together to form a substantially circular ring, each of the at least two semi-circular sections including a bottom gear layer that includes teeth or a channel that extends around an outside perimeter and a top mounting layer that attaches to the actuators.

19. The apparatus of claim 18, wherein the rotating assembly further includes a concave channel that extends around a perimeter of the mounting layer that receives bearings that are rotationally coupled to the frame assembly and partially extend into the circular opening to suspend the rotating assembly in the central opening.

20. A method for attaching a steering wheel actuator mechanism including a frame assembly and a rotating assembly to a steering wheel, comprising:

attaching the frame assembly to a steering wheel column;

attaching the rotating assembly around the steering wheel column and over the frame assembly;

inserting the rotating assembly down into an opening formed in the frame assembly and coupling the rotating assembly to a motor in the frame assembly;

attaching actuators to the rotating assembly so the actuators extend upwards through the steering wheel and sit against spokes in the steering wheel; and rotating the steering wheel by rotating the rotating assembly causing the actuators to rotate and move the spokes in the steering wheel.

21. A method according to claim 20 including:

attaching the frame assembly to the steering wheel column without removing the steering wheel; and attaching the rotating assembly around the steering wheel column and over the frame assembly without removing the steering wheel.

* * * * *